(12) United States Patent
Sinha et al.

(10) Patent No.: US 11,654,622 B2
(45) Date of Patent: *May 23, 2023

(54) PLASMA-TREATED SHEETS FOR ADDITIVE MANUFACTURING

(71) Applicant: The Boeing Company, Chicago, IL (US)

(72) Inventors: Nishant Kumar Sinha, Bangalore (IN); Om Prakash, Bangalore (IN)

(73) Assignee: The Boeing Company, Chicago, IL (US)

( * ) Notice: Subject to any disclaimer, the term of this patent is extended or adjusted under 35 U.S.C. 154(b) by 738 days.

This patent is subject to a terminal disclaimer.

(21) Appl. No.: 16/527,433

(22) Filed: Jul. 31, 2019

(65) Prior Publication Data

US 2021/0031442 A1    Feb. 4, 2021

(51) Int. Cl.
  *B32B 13/08*    (2006.01)
  *B29C 64/147*    (2017.01)
  (Continued)

(52) U.S. Cl.
  CPC ............ *B29C 64/147* (2017.08); *B29B 13/08* (2013.01); *B29C 64/268* (2017.08);
  (Continued)

(58) Field of Classification Search
  CPC ..... B29B 13/08; B29C 64/147; B29C 64/268; B29C 64/314; B29C 64/393; B29K 2101/12; B32B 2250/24; B32B 2274/00; B32B 2605/18; B32B 27/08; B32B 27/16; B32B 27/285; B32B 27/288;
  (Continued)

(56) References Cited

U.S. PATENT DOCUMENTS 5,755,913 A    5/1998    Liaw et al.
6,007,764 A    12/1999    Benda et al.
(Continued)

FOREIGN PATENT DOCUMENTS

EP    2108502 A2    10/2009
EP    3098060 A1    11/2016

OTHER PUBLICATIONS

Extended European Search Report, dated Dec. 11, 2020, regarding Application No. 20187844.4, 9 pages.

(Continued)

*Primary Examiner* — Lawrence D Ferguson
(74) *Attorney, Agent, or Firm* — Yee & Associates, P.C.

(57) ABSTRACT

Illustrative examples of forming and using suitably adapted material in an additive manufacturing process includes operations of: exposing a first polymer sheet to a first plasma, such that an amine-functionalized sheet surface is formed; exposing a second polymer sheet to a second plasma, such that an epoxide-functionalized sheet surface is formed; and combining the amine-functionalized sheet and the epoxide-functionalized sheet, such that the amine-functionalized sheet surface contacts the epoxide-functionalized sheet surface. The workpiece is subsequently heated to form a structure, where heating of the workpiece causes covalent chemical bonds to form between the plasma-treated first polymer sheet and the plasma-treaded second polymer sheet.

21 Claims, 5 Drawing Sheets

(51) Int. Cl.
*B29C 64/314* (2017.01)
*B29C 64/393* (2017.01)
*B29C 64/268* (2017.01)
*B29B 13/08* (2006.01)
*B29K 101/12* (2006.01)

(52) U.S. Cl.
CPC .......... *B29C 64/314* (2017.08); *B29C 64/393* (2017.08); *B29K 2101/12* (2013.01)

(58) Field of Classification Search
CPC ..... B32B 27/302; B32B 27/308; B32B 27/32; B32B 27/34; B32B 37/06; B32B 7/04; B32B 7/10; B33Y 10/00; B33Y 70/00; C09J 2423/046; C09J 2423/048; C09J 2427/006; C09J 2427/008; C09J 2433/006; C09J 2433/008; C09J 2471/005; C09J 2471/006; C09J 2477/006; C09J 2477/008; C09J 5/02

See application file for complete search history.

(56) References Cited

U.S. PATENT DOCUMENTS

| | | |
|---|---|---|
| 2002/0014306 A1 | 2/2002 | Virtanen |
| 2007/0281126 A1 | 12/2007 | Lahann et al. |
| 2009/0181592 A1* | 7/2009 | Dugan ................ D02G 3/441 428/374 |
| 2014/0023817 A1 | 1/2014 | Kaushik et al. |
| 2016/0271874 A1 | 9/2016 | Tsai et al. |
| 2019/0029337 A1 | 1/2019 | DeGanello et al. |

OTHER PUBLICATIONS

Extended European Search Report, dated Jan. 11, 2021, regarding Application No. 20187846.4, 7 pages.

* cited by examiner

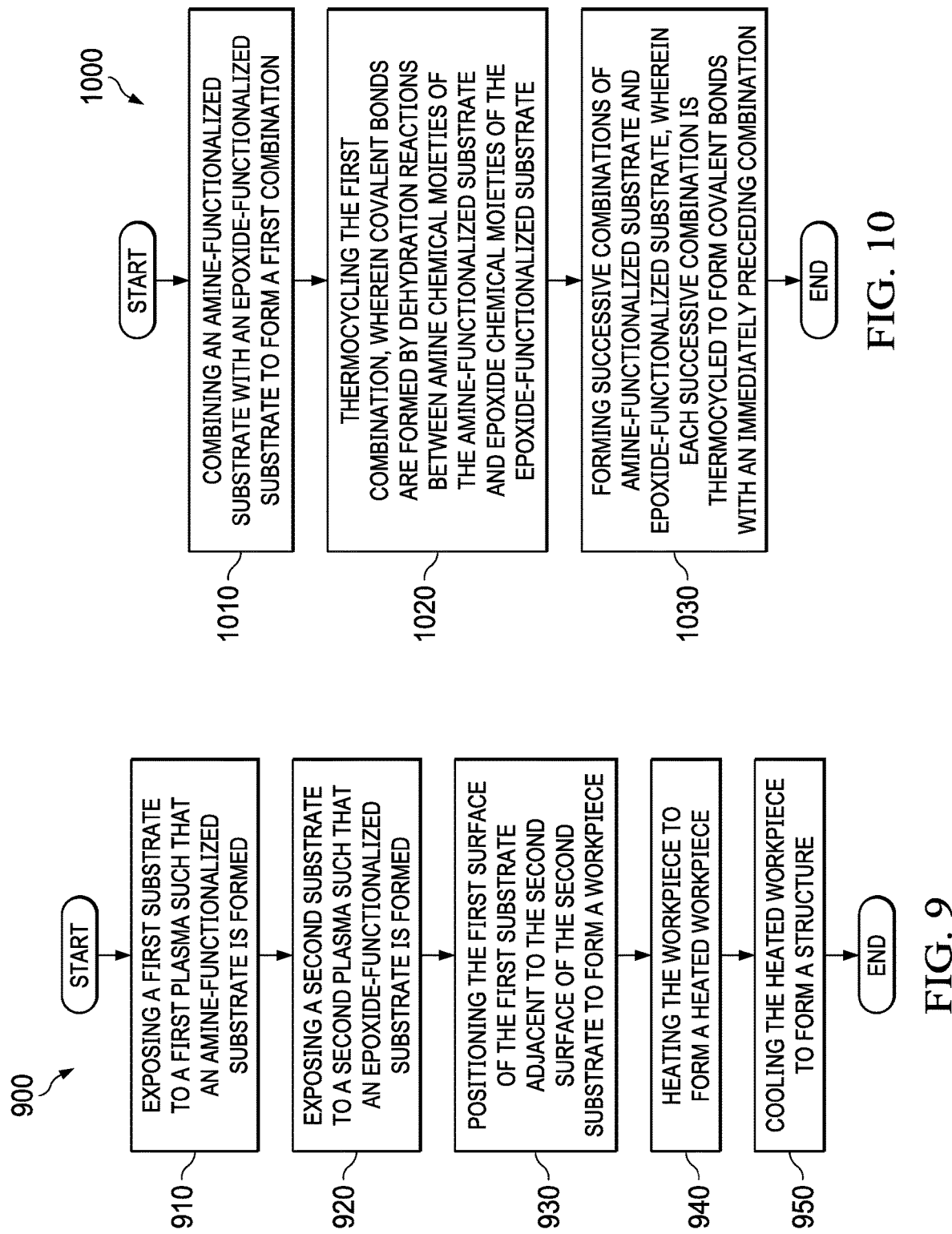

PLASMA-TREATED SHEETS FOR ADDITIVE MANUFACTURING

CROSS-REFERENCE TO RELATED APPLICATION

This application is related to the following U.S. patent application Ser. No. 16/527,385, entitled "Plasma-Treated Powders for Additive Manufacturing," and filed on Jul. 31, 2019, which is incorporated herein by reference in its entirety.

BACKGROUND INFORMATION

Field

The present disclosure generally relates to additive manufacturing, and more particularly, to compositions, preparations, and uses of plasma-treated sheets in additive manufacturing.

Background

Additive manufacturing is a manufacturing process in which an additive manufacturing system fabricates an object based on a three-dimensional model or other digital representation of a three-dimensional object. Additive manufacturing systems fabricate objects by sequentially depositing layers of constituent material in the shape of the object until it is formed. In one example, successive layers of material are deposited. These deposited layers of material are adhered to build up the final object. The final three-dimensional object is fully dense and can include complex shapes— "fully dense" generally indicating that an object is substantially free of unintended void regions.

A typical additive manufacturing process includes depositing a base layer of material onto a build surface, and then depositing a second layer of material on the base layer. An energy source is directed onto the assembly to adhere the second layer to the base layer. The build surface is initially a form tool. For later depositions, the build surface is a previously deposited layer of material. Additional layers of material are deposited to fabricate the object layer-by-layer.

One type of additive manufacturing process forms successive layers of a fabricated object using sequential layer depositions. In such a process, each successive layer of the fabricated object is generally attached to the immediately preceding layer by adhering material in regions of contact between adjacent material layers. For example, an $n^{th}$ layer adhered to an $(n-1)^{th}$ layer, where 'n' is the currently-deposit layer in the fabrication sequence, and 'n-1' is the immediately-preceding layer in the fabrication sequence. The adhering of material in contact with and between adjacent layers, however, may not provide as strong of an attachment between sequentially formed layers as desired in terms of one or more specifications for an additively manufactured part.

Therefore, it would be desirable to have a composition, method, apparatus, and system that take into account at least some of the issues discussed above, as well as other possible issues. For example, it would be desirable to have a composition, method, apparatus, and system that overcome technical problems associated with providing strong or otherwise improved attachment between sequentially formed layers of an object using an additive manufacturing process.

SUMMARY

One illustrative example of the present disclosure provides a three-dimensional part. The three-dimensional part includes a first substrate with a first side, and a second substrate with a second side. The second side of the second substrate is covalently bonded through a plurality of nitrogen atoms to the first side of the first substrate.

Another illustrative example of the present disclosure provides a method for additive manufacturing. The method includes exposing a first substrate to a first plasma, such that an amine-functionalized substrate is formed. The amine-functionalized substrate includes amine chemical moieties on a first surface of the first substrate. A second substrate is exposed to a second plasma, such that an epoxide-functionalized substrate is formed. The epoxide-functionalized substrate includes epoxide chemical moieties on a second surface of the second substrate. The first surface of the first substrate is positioned adjacent to the second surface of the second substrate to form a workpiece. The workpiece is heated to form a heated workpiece. The heated workpiece is cooled to form a structure.

Another illustrative example of the present disclosure provides a method for additive manufacturing. The method comprises combining an amine-functionalized substrate with an epoxide-functionalized substrate to form a first combination. The amine-functionalized substrate is provided as a first substrate treated with a first plasma, and the epoxide-functionalized substrate is provided as a second substrate treated with a second plasma. The first combination is thermocycled to form covalent bonds by dehydration reactions occurring between amine chemical moieties of the amine-functionalized substrate and epoxide chemical moieties of the epoxide-functionalized substrate. Successive combinations of amine-functionalized substrate and epoxide-functionalized substrate are formed, where each successive combination is thermocycled to form covalent bonds with an immediately preceding combination.

Yet another illustrative example of the present disclosure provides an additive manufacturing system that includes a laser system. The additive manufacturing system also includes a laminating system that disposes a first chemically-functionalized substrate adjacent to a second chemically-functionalized substrate. The second chemically-functionalized substrate is different than the first chemically-functionalized substrate. Covalent bonds are formed between the first chemically-functionalized substrate and the second chemically-functionalized substrate upon exposure to heat. The additive manufacturing system also includes a build platform and a controller in communication with the laser system and the laminating system. The controller controls the laminating system to deposit the first chemically-functionalized substrate on the build platform. The controller also controls the laminating system to deposit the second chemically-functionalized substrate on the first chemically-functionalized substrate. The controller also controls the laser system to apply heat to the first chemically-functionalized substrate and the second chemically-functionalized substrate.

Still another illustrative example of the present disclosure provides a precursor material for additive manufacturing. The precursor material includes a first substrate. A first side of the first substrate includes a first plurality of amine functional groups. A second side of the first substrate includes a second plurality of epoxide functional groups. The second side of the first substrate opposes the first side of the first substrate. The first substrate is configured to covalently bond with at least one of a second substrate or a third substrate. Upon exposure to heat, at least one of: the first plurality of amine functional groups forms covalent bonds with a third plurality of epoxide functional groups disposed on a third side of the second substrate; or the second plurality of epoxide functional groups forms covalent bonds with a fourth plurality of amine functional groups disposed on a fourth side of the third substrate.

Features and functions can be achieved independently in various examples of the present disclosure, or may be combined in yet other examples, in which further details can be seen with reference to the following description and drawings.

BRIEF DESCRIPTION OF THE DRAWINGS

Representative features of illustrative examples are set forth in the appended claims. Illustrative examples, however, as well as representatively described modes of use, further objectives, and features thereof, will best be understood by reference to the following detailed description of illustrative examples of the present disclosure when read in conjunction with accompanying drawings, wherein:

FIG. 9 is an illustration of a flowchart of a process for an additive manufacturing method in accordance with an illustrative example;

FIG. 10 is an illustration of a flowchart of a process for an additive manufacturing method in accordance with an illustrative example;

DETAILED DESCRIPTION

Figure 1:
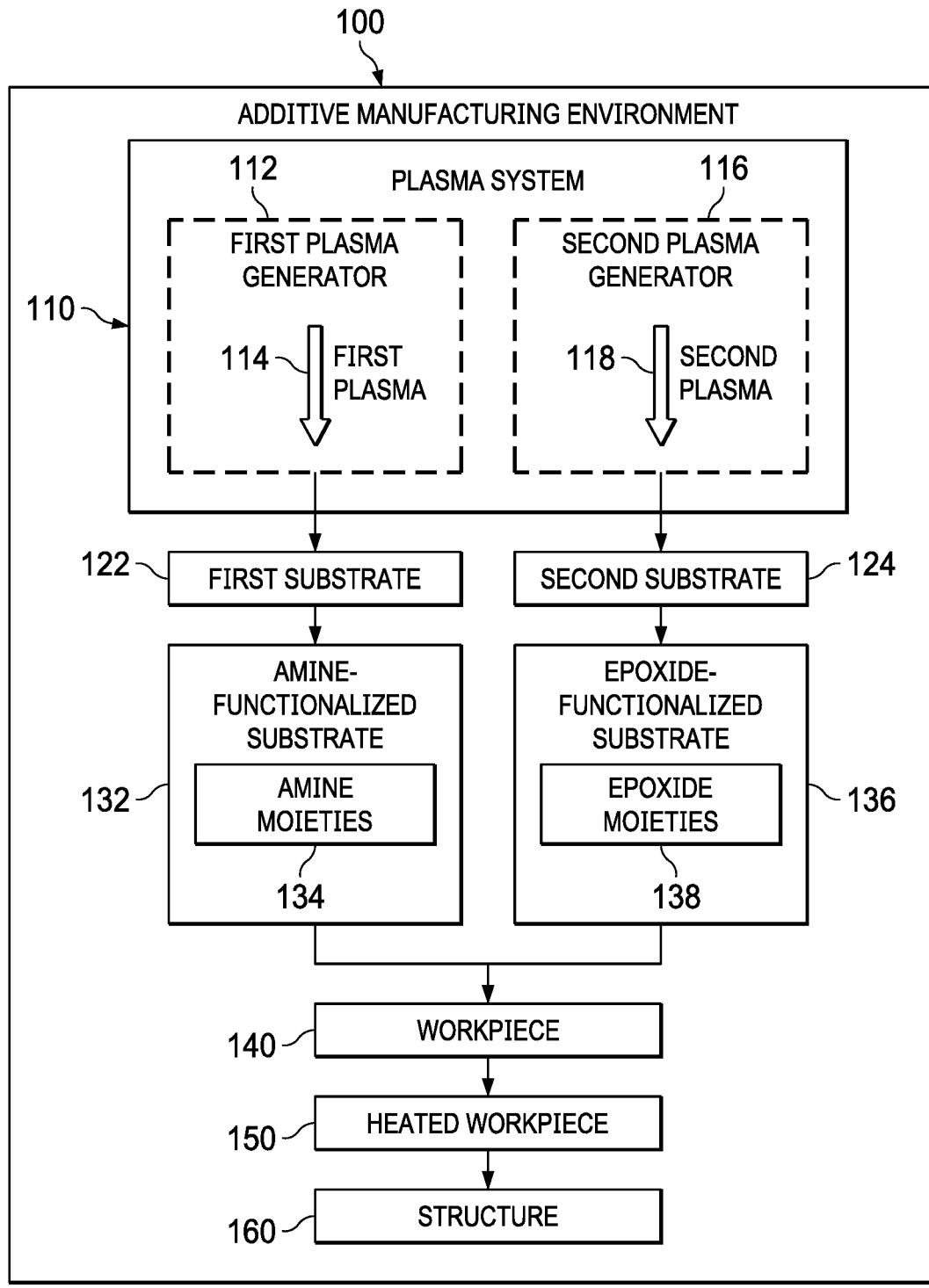
FIG. 1 is an illustration of a block diagram of an additive manufacturing environment in accordance with an illustrative example.

Illustrative examples herein recognize and take into account one or more different considerations. For example, illustrative examples recognize and take account that parts manufactured with additive manufacturing processes generally exhibit intra-layer and inter-layer part strength that is lower than that of parts manufactured with, for example, injection molding. More particularly, illustrative examples also recognize and take into account that parts manufactured with additive manufacturing processes typically have limited chain diffusion between constituent material layers.

Illustrative examples herein describe methods of forming strong three-dimensional parts with molecular/chemical cross-linking between layers of constituent material. In illustrative examples described herein, polymer sheets are plasma treated to include, for example, amine ($-NH_2$) functionality or epoxide functionality. A combination of plasma-treated sheets can include a same polymer material. The combined plasma-treated sheets are then heated. Cross-linking reactions that form covalent bonds between the plasma-treated sheets provide strong chemical bonds and overall stronger three-dimensional parts as compared to, for example, other additive manufacturing techniques.

In some illustrative examples, thermoplastic sheets can be plasma treated to include, for example, amine functionality and epoxide functionality on either side. The plasma-treated sheets can then be sequentially stacked, such that they are selectively joined at predetermined locations or regions at successive interfaces between build layers using a heat source, such as a laser that can be selectively focused and moved. Cross-linking reactions that form successive covalent bonds between the plasma-treated sheets, in addition to interlayer chain diffusion, provides strong chemical bonds and overall stronger three-dimensional parts as compared to, for example, other additive manufacturing techniques.

In some implementations, a first surface of a first polymer sheet is treated with an ammonia ($NH_3$) plasma or nitrogen plasma—or a nitrogen and hydrogen plasma—to selectively introduce amine chemical functionality on the first surface. A second surface of a second polymer sheet is treated with an oxygen or carbon dioxide ($CO_2$) plasma to introduce epoxide chemical functionality on the second surface. The first surface of the first plasma-treated sheet is brought into contact with the second surface of the second plasma-treated sheet, and thereafter subjected to a heat source, such as a laser, to initiate chemical cross-linking.

Chemical cross-linking involves chemical dehydration reactions occurring between amine chemical moieties of the plasma-treated first sheet and epoxide chemical moieties of the plasma-treated second sheet. The first sheet can comprise a same polymer material as the second sheet. Covalent bonds are formed by dehydration reactions—for example, chemical bonds through nitrogen atoms formerly associated with the amine chemical moieties prior to thermal treatment. The covalent bonds are between the first surface of the first sheet and the second surface of the second sheet. Water is produces as a byproduct of the chemical reaction. The covalent bonds formed by chemical cross-linking between the first sheet and the second sheet generally provide stronger adherence between cross-linked sheets than between sheets that are joined together using interlayer chain diffusion alone—thereby leading to improved part strength with chemical cross-linking.

In other illustrative examples, a first thermoplastic sheet is treated with an ammonia or nitrogen plasma—or a nitrogen ($N_2$) and hydrogen ($H_2$) plasma—to selectively introduce amine chemical functionality on a surface of the first thermoplastic sheet. A second thermoplastic sheet is treated with an oxygen ($O_2$) or carbon dioxide plasma to introduce epoxide chemical functionality on a surface of the second thermoplastic sheet. The first plasma-treated surface is located to and contacts the second plasma-treated surface. Location of the first plasma-treated surface can be, for example, above, over, or on the second plasma-treated surface. The formation of a first feature "over" or "on" a second feature may include examples in which the first and second features are formed in direct contact, and may also include examples in which additional features may be formed between the first and second features, such that the first and second features may not be in direct contact. Spatially relative terms, such as "up," "down," "under," "beneath," "below," "lower," "upper," "above," "over," "higher," "adjacent," "interadjacent," "interposed," "between," or the like, may be used herein for ease of description to representatively describe one or more elements or features in relation to other elements or features as representatively illustrated in the figures. Spatially relative terms are intended to encompass different orientations of devices or objects in use or operation, in addition to orientations illustrated in the figures. An apparatus, device, or object may be otherwise spatially transformed—for example, rotated by 90 degrees—and the spatially relative descriptors used herein may likewise be interpreted accordingly.

The sheet assembly is subjected to a heat source, such as a laser, to initiate sintering and chemical cross-linking. In some illustrative examples, a sub-surface deposition of heat at a focused depth along a predetermined path can be accomplished using any available methods, systems, or devices. For example, a number of polymer sheets may be stacked over each other, and a sub-surface deposition of heat within the stack of sheets may be performed to initiate sintering and chemical cross-linking at a predetermined depth within the stack.

Chemical cross-linking between sheets involves dehydration reactions occurring between amine chemical moieties of the first thermoplastic sheet and epoxide chemical moieties of the second thermoplastic sheet. The dehydration reactions form covalent bonds—for example, through nitrogen atoms formerly associated with the amine chemical moieties prior to chemical cross-linking. The covalent bonds are between respective plasma-treated first and second thermoplastic sheets. Water ($H_2O$) is produced as a byproduct of the dehydration reaction. Covalent bonds formed by chemical cross-linking between the plasma-treated thermoplastic sheets generally provides stronger adherence between cross-linked sheet surfaces that leads to improved overall part strength. Cross-linking between sheets takes place at interfaces between the sheets, and operates to join the sheets together with covalent chemical bonds, as well as thermally induced chain diffusion of polymer material forming the sheets. Covalent bonds formed with chemically functionalized sheets, in accordance with illustrative examples described herein, contribute to improved strength of additively manufacture parts. By way of comparison to existing technologies employing only polymer chain diffusion in sheet-based additive manufacturing processes, sheets that are not chemically functionalized to form covalent bonds with each other will not exhibit desired part strength. Chemical cross-linking with formation of attendant covalent bonds, on the other hand, provides improved part strength as compared to techniques employing polymer chain diffusion alone.

In illustrative examples, one or more technical solutions are presented that overcome technical problems associated with providing strong inter-layer adhesion in additively manufactured parts. As a result, one or more technical solutions described herein provide technical effects of enabling formation of chemical bonds between constituent materials used in additive manufacturing processes, enabling fabrication of additively manufactured parts that are at least as strong as parts fabricated with injection molding techniques, enabling increased utilization of additive manufacturing for making strong parts, supporting part qualification with respect to manufacturing specifications or mechanical property requirements, or realizing cost savings associated with using additive manufacturing to make parts that are at least as strong as parts fabricated with other processes.

The flowcharts and block diagrams in the different depicted examples illustrate architecture, functionality, and operation of some possible implementations of apparatuses and methods in illustrative examples. In this regard, each block in flowcharts or block diagrams can represent at least one of a module, a segment, a function, or a portion of an operation or step. The figure illustrations are not meant to imply physical or architectural limitations to the manner in which illustrative examples may be implemented. Other components in addition to or in place of ones illustrated may be used. Some components may be unnecessary. Additionally, blocks are presented to illustrate some functional components. One or more blocks may be combined, divided, or combined and divided into different blocks when implemented in an illustrative example.

With reference now to the figures, and in particular with reference to FIG. 1, an illustration of a block diagram of an additive manufacturing environment is depicted in accordance with an illustrative example. As depicted, additive manufacturing environment 100 includes plasma system 110. In this illustrative example, plasma system 110 is a physical system and can include any type or any number of component devices. In this illustrative example, plasma system 110 can include at least one of a wand plasma device, an atmospheric plasma device, a plasma chamber, other suitable type of component device, or combinations thereof.

As used herein, the phrase "at least one of," when used with a list of items, means different combinations of one or more of the listed items can be used, and only one of each item in the list may be needed. In other words, "at least one of" means any combination of items or number of items can be used from the list, but not all of the items in the list are required. The item can be a particular object, a thing, or a category. For example, without limitation, "at least one of item A, item B, or item C" may include item A, item A and item B, or item B. This example also may include item A and item B and item C, or item B and item C. Of course, any permutative combination of these items can be present. In some illustrative examples, "at least one of item A, item B, or item C" can be, for example, without limitation: two of item A, one of item B, and ten of item C; four of item B and seven of item C; or other suitable combinations.

As used herein, the terms "comprises," "comprising," "includes," "including," "has," "having," or any contextual variant thereof, are intended to cover a non-exclusive inclusion. For example, a process, product, composition, article, or apparatus that comprises a list of elements is not necessarily limited to only those elements, but may include other elements not expressly listed or inherent to such process, product, composition, article, or apparatus. Furthermore, unless expressly stated to the contrary, "or" refers to an inclusive or and not an exclusive or. That is, the term "or" as used herein is generally intended to mean "and/or" unless otherwise indicated. For example, a condition "A or B" is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless the context clearly indicates otherwise. Also, as used in the description herein, the meaning of "in" includes "in" and "on," unless the context clearly indicates otherwise.

Plasma system 110 includes first plasma generator 112 and second plasma generator 116. First plasma generator 112 is configured to generate first plasma 114. Second plasma generator 116 is configured to generate second plasma 118. In some illustrative examples, first plasma generator 112 can be a same plasma generator as second plasma generator 116 used at different times to produce first plasma 114 and second plasma 118.

First substrate 122 is exposed to first plasma 114 to produce amine-functionalized substrate 132, such that amine-functionalized substrate 132 includes amine chemical functional groups on a surface of first substrate 122. For example, first plasma generator 112 can be suitably configured to produce an ammonia-containing plasma as first plasma 114. In illustrative examples, first plasma 114 can include ammonia ($NH_3$), or first plasma 114 can conjunctively or alternatively include molecular nitrogen ($N_2$), molecular hydrogen ($H_2$), or molecular nitrogen and molecular hydrogen.

As used herein, the term "substrate" generally refers to an object which provides a surface on which something is deposited. As used herein, the term "sheet" generally means being in the form of a broad, flat piece of material. In some illustrative examples, sheets can range in thickness from 100µ to 1000µ. Additionally, any number of substrates or sheets can comprise a same material, and can be provided in any number of thicknesses or aspect ratios.

First substrate 122 includes a polymer material suitably configured for use in a sheet-based additive manufacturing process. For example, first substrate 122 can include, nylon, flame-retardant nylon, mineral/glass-filled nylon, polystyrene, polyethylene, polymethylmethacrylate (PMMA), thermoplastic elastomers, polyarylether ketones (PAEK), other polymer material, or the like. In representative implementations, selection of a suitable polymer material can be based on, for example, a desired melting temperature, characteristic of a three-dimensional part so formed, or characteristic relating to stability under conditions for achieving an activation energy associated with forming covalent chemical bonds between sheets or substrates.

Exposure of first substrate 122 to first plasma 114 produces amine-functionalized substrate 132. Amine-functionalized substrate 132 includes amine chemical moieties 134 on plasma-exposed surfaces of amine-functionalized substrate 132. As depicted, amine chemical moieties 134 can be a number of —$NH_2$ chemical functional groups.

Second substrate 124 is exposed to second plasma 118 to produce epoxide-functionalized substrate 136, such that epoxide-functionalized substrate 136 includes epoxide chemical functional groups on surfaces of second substrate 124. For example, second plasma generator 116 can be suitably configured to produce an oxygen-containing plasma as second plasma 118. In illustrative examples, second plasma 118 can include oxygen, or second plasma 118 can conjunctively or alternatively include molecular oxygen ($O_2$) or carbon dioxide ($CO_2$).

Second substrate 124 includes a polymer material suitably configured for use in an additive manufacturing process. Second substrate 124 can include a same polymer material as first substrate 122. For example, second substrate 124 can include, nylon, flame-retardant nylon, mineral/glass-filled nylon, polystyrene, polyethylene, polymethylmethacrylate (PMMA), thermoplastic elastomers, polyarylether ketones (PAEK), other polymer material, or the like. In representative implementations, selection of a suitable polymer material can be based on, for example, a desired melting temperature, characteristic of a three-dimensional part so formed, or characteristic relating to stability under conditions for achieving an activation energy associated with forming covalent chemical bonds between substrates.

In illustrative examples, first substrate 122 or second substrate 124 can comprise a thermoplastic material. A thermoplastic, or thermo-softening plastic, is a polymer material that becomes pliable or moldable at elevated temperature and solidifies upon cooling. In a heated state, thermoplastics can be reshaped, and can be used to produce parts by various polymer processing techniques, such as injection molding, compression molding, calendering, and extrusion. Physical properties of thermoplastics can change drastically without an associated phase change above glass transition temperatures and below melting points. Some thermoplastics do not fully crystallize below their glass transition temperature—retaining some or all of their amorphous characteristics. Amorphous and semi-amorphous thermoplastics can be used when high optical clarity is desired.

Exposure of second substrate 124 to second plasma 118 produces epoxide-functionalized substrate 136. Epoxide-functionalized substrate 136 includes epoxide chemical moieties 138 on exposed surfaces of epoxide-functionalized substrate 136. In illustrative examples, epoxide chemical moieties 138 includes bridging —O— chemical functional groups.

Amine-functionalized substrate 132 and epoxide-functionalized substrate 136 are combined to form workpiece 140. For example, amine-functionalized substrate 132 can be located to contact epoxide-functionalized substrate 136, such than amine chemical moieties 134 are disposed on or near epoxide chemical moieties 138.

Workpiece 140 is subjected to heat in order to form heated workpiece 150. In illustrative examples, one or more heat sources can include a laser—for example, as used in a selective laser sintering additive manufacturing system. It will be appreciated, however, that other types of heat sources can be alternatively, conjunctively, or sequentially used. For example, a thermal fusion bonding process can be used. Thermal fusion bonding is a process which fuses more than one material or substrate via a thermal cycle. The temperature for performing thermal fusion is typically somewhat higher than a glass transient temperature for the materials being fused.

As described in greater detail later herein with reference to FIGS. 5-8, heating of workpiece 140 initiates chemical reactions between amine chemical moieties 134 and epoxide chemical moieties 138 to produce covalent chemical bonds between amine-functionalized substrate 132 and epoxide-functionalized substrate 136. Formation of covalent chemical bonds provides improved part strength with representative implementations of materials and additive manufacturing processes according to illustrative examples.

Heated workpiece 150 is thereafter cooled to form structure 160. In an illustrative example, structure 160 may not be a fully-formed part. For example, in some illustrative examples, structure 160 can be a component layer or a subset of component layers of an additively manufactured three-dimensional part. Structure 160 can be, for example, an aircraft part, an interior monument, a wall, an air duct, a fairing, a wire shroud, a power distribution panel, a stowage case, a gear box cover, a lattice structure, a skin panel, a bracket, a handle, or the like.

Figure 2:
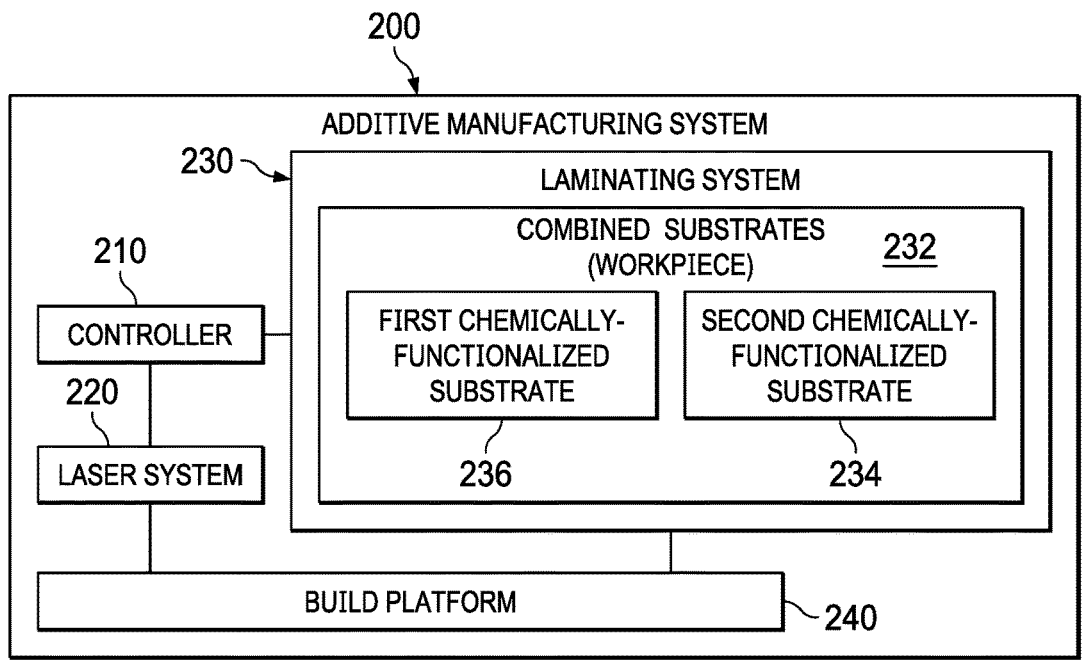
FIG. 2 is an illustration of a block diagram of an additive manufacturing system in accordance with an illustrative example.

Turning now to FIG. 2, an illustration of a block diagram of an additive manufacturing system is depicted in accordance with an illustrative example. In this illustrative example, additive manufacturing system 200 is an example of a manufacturing system that can use workpiece 140 in the form of chemically bonded sheets to fabricate structure 160 in FIG. 1.

Additive manufacturing system 200 includes a number of different components. As generally depicted, additive manufacturing system 200 comprises controller 210, laser system 220, laminating system 230, and build platform 240. Controller 210 is in communication with laser system 220. Controller 210 is also in communication with laminating system 230.

Build platform 240 provides an initial base to begin deposition of material to form an additively manufactured part. Build platform 240 also provides support for building up sequential component layers of the manufactured part during additive deposition of material to form the part. Laminating system 230 supplies material for deposition on, above, or over build platform 240. As generally depicted in FIG. 2, laminating system 230 includes combined substrates 232.

In an illustrative example, combined substrates 232 are an example of an implementation of workpiece 140 in FIG. 1. As generally depicted, combined substrates 232 include first chemically-functionalized substrate 236 and second chemically-functionalized substrate 234. First chemically-functionalized substrate 236 can include a same polymer material as second chemically-functionalized substrate 234. As discussed later herein, the ratio of amine-to-epoxide groups can be adjusted, such that a desired amount or density of cross-linking is achieved.

Chemical functionalization of first chemically-functionalized substrate 236 and second chemically-functionalized substrate 234 is such that a chemical reaction between chemical moieties of first chemically-functionalized substrate 236 and second chemically-functionalized substrate 234 can be performed to produce covalent bonds between first chemically-functionalized substrate 236 and second chemically-functionalized substrate 234.

In an illustrative example, first chemically-functionalized substrate 236 can include amine chemical moieties produced from treating a first polymer sheet with an ammonia-containing plasma, and second chemically-functionalized substrate 234 can include epoxide chemical moieties produced from treating a second polymer sheet with an oxygen-containing plasma.

Laminating system 230 supplies combined substrates 232 to build platform 240. Laser system 220 is configured to heat combined substrates 232 deposited on, over, or above build platform 240. Heating of combined substrates 232 initiates chemical reactions between amine chemical moieties of first chemically-functionalized polymer and epoxide moieties of second chemically-functionalized polymer to produce covalent chemical bonds between component layers of combined substrates 232.

Controller 210 is a physical hardware system or device that controls and is in communication with laser system 220 and laminating system 230. In an illustrative example, controller 210 controls and communicates with laminating system 230 to supply and sequentially deposit a number of layers of combined substrates 232 on, over, or above build platform 240 during additive manufacture of a three-dimensional part. Controller 210 is also configured to control laser system 220 to apply heat to each of the number of layers of combined substrates 232 during respective stages of additive manufacture of a three-dimensional part. For example, controller 210 communicates with laminating system 230 to supply and deposit an initial layer of combined substrates 232 on build platform 240. Controller 210 then communicates with laser system 220 to heat the initial layer of combined substrates 232 to initiate sintering and chemical cross-linking between chemically functionalized layers of combined substrates 232 of the initial layer.

The heated initial layer is then cooled. In some examples, cooling can include an active process of removing thermal energy from the part or a layer of the part. In other examples, cooling can include a passive process of allowing a heated layer to radiatively dissipate heat to the local environment.

Controller 210 thereafter communicates with laminating system 230 to supply and deposit another complimentary chemically-functionalized sheet on the cooled initial layer. The process is repeated to build up additional sintered and chemically cross-linked layers until fabrication of the three-dimensional part is substantially complete.

Controller 210 can be implemented in software, hardware, firmware or a combination thereof. When software is used, operations performed by controller 210 can be implemented in program code configured to run on hardware, such as a hardware processor unit. When firmware is used, the operations performed by controller 210 can be implemented in program code and data stored in persistent memory to run on a processor unit. When hardware is employed, the hardware can include circuits that operate to perform operations in controller 210.

In illustrative examples, hardware can take a form selected from at least one of a circuit system, an integrated circuit, an application specific integrated circuit (ASIC), a programmable logic device, or other suitable type of hardware configured to perform a number of operations. With a programmable logic device, the device can be configured to perform any number of operations. The device can be reconfigured at a later time, or can be permanently configured to perform any number of operations. Programmable logic devices include, for example, a programmable logic array, a programmable array logic, a field programmable logic array, a field programmable gate array (FPGA), or other suitable hardware devices. Additionally, processes can be implemented in organic components integrated with inorganic components, and can be comprised entirely of organic components excluding a human being. For example, processes can be implemented as circuits in organic semiconductors.

Figure 3:
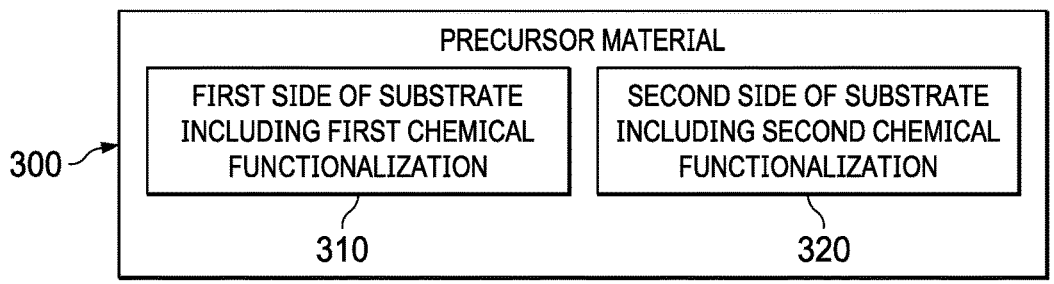
FIG. 3 is an illustration of a block diagram of a precursor material in accordance with an illustrative example.

Turning now to FIG. 3, an illustration of a block diagram of a precursor material is depicted in accordance with an illustrative example. In this example, precursor material 300 includes a first side of a substrate including a first chemical functionalization 310 and a second side of a substrate including a second chemical functionalization 320. In some illustrative examples, precursor material 300 can be workpiece 140 illustrated in FIG. 1, or combined substrates 232 illustrated in FIG. 2. In an illustrative example, the first side and the second side can be opposing sides of a same substrate. In other illustrative examples, the first side can be a surface of a first substrate, and the second side can be a surface of a second substrate different than the first substrate.

In an illustrative example, first side of substrate including first chemical functionalization 310 can be produced or otherwise formed in accordance with any of the compositions, processes, devices, systems, or methods described above with respect to amine-functionalized substrate 132 as illustrated in FIG. 1, or first chemically-functionalized substrate 236 as illustrated in FIG. 2. Second side of substrate including second chemical functionalization 320 can be produced or otherwise formed in accordance with any of the compositions, processes, devices, systems, or methods described above with respect to epoxide-functionalized substrate 136 as illustrated in FIG. 1, or second chemically-functionalized substrate 234 as illustrated in FIG. 2.

Figure 4:
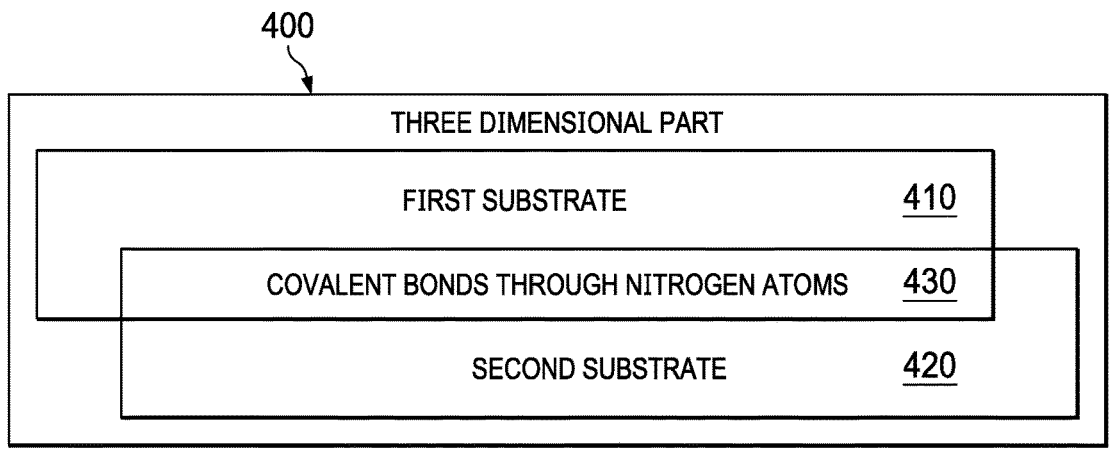
FIG. 4 is an illustration of a block diagram of a three-dimensional part in accordance with an illustrative example.

Turning now to FIG. 4, an illustration of a block diagram of a three-dimensional part is depicted in accordance with an illustrative example. Three-dimensional part 400 is an example of structure 160 in FIG. 1. Three-dimensional part 400 includes first substrate 410 and second substrate 420. In some implementations, three-dimensional part 400 can include a substantially fully formed part. In other implementations, three-dimensional part 400 can include a partially-formed part at any stage of additive manufacture. Although FIG. 4 illustrates first substrate 410 and second substrate 420 offset with respect to each other, other illustrative examples include first substrate 410 and second substrate 420 being substantially aligned with one another.

In an illustrative example, first substrate 410 and second substrate 420 can include a same polymer material. First substrate 410 and second substrate 420 are respectively adhered to one another with covalent bonds. In an illustrative example, the covalent bonds are through nitrogen atoms 430—for example, as described above with reference to illustrative examples according to FIG. 1 or FIG. 2.

Figure 5:
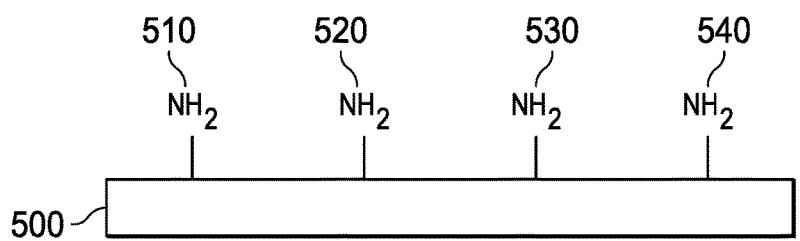
FIG. 5 is an illustration of a first plasma-treated substrate in accordance with an illustrative example.

Turning now to FIG. 5, an illustration of a first plasma-treated substrate is depicted in accordance with an illustrative example. As depicted, amine-functionalized sheet 500 includes amine chemical moieties, such as amine chemical moiety 510, amine chemical moiety 520, amine chemical moiety 530, and amine chemical moiety 540—for example, as described above with reference to illustrative examples according to amine moieties 134 as depicted in FIG. 1, or first chemically-functionalized substrate 236 as depicted in FIG. 2.

Figure 6:
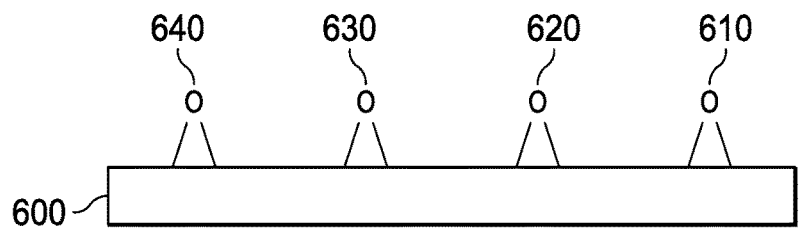
FIG. 6 is an illustration of a second plasma-treated substrate in accordance with an illustrative example.

Turning now to FIG. 6, an illustration of a second plasma-treated substrate is depicted in accordance with an illustrative example. As depicted, epoxide-functionalized sheet 600 includes epoxide chemical moieties, such as epoxide chemical moiety 610, epoxide chemical moiety 620, epoxide chemical moiety 630, and epoxide chemical moiety 640—for example, as described above with reference to illustrative examples according to epoxide moieties 138 as depicted in FIG. 1, or second chemically-functionalized substrate 234 as depicted in FIG. 2.

Figure 7:
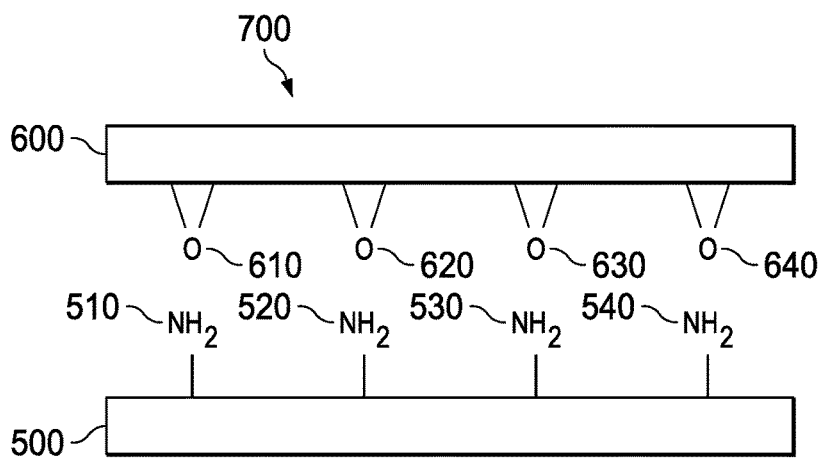
FIG. 7 is an illustration of a second plasma-treated substrate positioned adjacent to a first plasma-treated substrate in accordance with an illustrative example.

Turning now to FIG. 7, an illustration of a second plasma-treated substrate positioned adjacent to a first plasma-treated substrate is depicted in accordance with an illustrative example. As depicted, amine chemical moiety 510, amine chemical moiety 520, amine chemical moiety 530, and amine chemical moiety 540 of amine-functionalized sheet 500 are disposed adjacent to or otherwise near epoxide chemical moiety 610, epoxide chemical moiety 620, epoxide chemical moiety 630, and epoxide chemical moiety 640 of epoxide-functionalized sheet 600.

Figure 8:
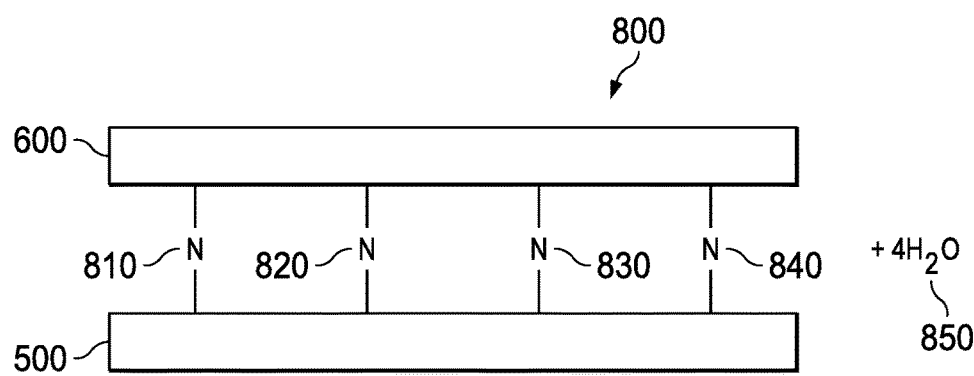
FIG. 8 is an illustration of a first plasma-treated substrate covalently bonded to a second plasma-treated substrate in accordance with an illustrative example.

Turning now to FIG. 8, an illustration of a first plasma-treated substrate covalently bonded to a second plasma-treated substrate is depicted in accordance with an illustrative example. As depicted, chemically bonded sheets 700 include amine-functionalized sheet 500 and epoxide-functionalized sheet 600 adhered to one another with covalent bonds through nitrogen atoms 810, 820, 830, and 840. It will be appreciated that a much greater number of amine-functionalized substrates and epoxide-functionalized substrates can be similarly covalently bonded between each other—for example, between adjacent depositions of immediately successive layers of an additive manufacturing sequence, or laterally extending along amine-functionalized sheet 500 and epoxide-functionalized sheet 600.

Heating of amine-functionalized sheet 500 and epoxide-functionalized sheet 600 achieves an activation energy associated with initiating chemical reactions between amine chemical moiety 510 and epoxide chemical moiety 610, between amine chemical moiety 520 and epoxide chemical moiety 620, between amine chemical moiety 530 and epoxide chemical moiety 630, and between amine chemical moiety 540 and epoxide chemical moiety 640. A covalent bond through nitrogen atom 810 is formed as a result of chemical reaction between amine chemical moiety 510 and epoxide chemical moiety 610—along with one molecule of water 850 as a byproduct. A covalent bond through nitrogen atom 820 is formed as a result of chemical reaction between amine chemical moiety 520 and epoxide chemical moiety 620—along with another molecule of water 850 as a byproduct. A covalent bond through nitrogen atom 830 is formed as a result of chemical reaction between amine chemical moiety 530 and epoxide chemical moiety 630—along with another molecule of water 850 as a byproduct. A covalent bond through nitrogen atom 840 is formed as a result of chemical reaction between amine chemical moiety 540 and epoxide chemical moiety 640—along with another molecule of water 850. For example, the chemical cross-linking reactions may proceed in accordance with the following general chemical reaction scheme:

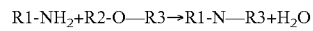

$$R1\text{-}NH_2 + R2\text{-}O\text{---}R3 \rightarrow R1\text{-}N\text{---}R3 + H_2O$$

In an illustrative example, R1 is an atom of a first sheet, and R2 and R3 are geminal atoms of a second sheet that are bridged with an epoxide functional group. Attendant to chemical cross-linking, the epoxy group opens to form a covalent bond between R1 and R3 through nitrogen. After the chemical cross-linking reaction opens the cyclic ether ring of the epoxy group, R2 remains disposed on the surface of the second sheet, and generally does not participate in covalent bonding between the first sheet and the second sheet.

In general, the cross-linking reaction occurs via a nucleophilic attack of the amine nitrogen on the terminal carbon of the epoxy group. The mechanism is generally believed to proceed as an SN2-type II reaction, and thus the reaction rate obeys second-order kinetics. In such a mechanism, the hydrogen atom of the amine group does not react directly with the epoxy group, but rather the nucleophilic nitrogen atom attacks a carbon atom of the epoxy ring, and then the hydrogen atom from the amine eventually transfers to the epoxy oxygen atom to form—OH. The mechanism suggests that the reactivity depends on the nucleophilicity of the amine—which can vary substantially with electronic and steric effects of near field substituents.

Covalent bonds through nitrogen atoms 810, 820, 830, and 840 generally correspond to some of covalent bonds through nitrogen atoms 430, as representatively illustrated in FIG. 4. Reference to this process as a "dehydration reaction," or contextual variants thereof, indicates that water 850 is produced as a byproduct of chemical reaction between amine chemical moieties 134 and epoxide chemical moieties 138 of FIG. 1.

Although methods, steps, operations, or procedures are presented in a specific order, this order may be changed in different examples. In some examples, to the extent multiple steps are shown as sequential in the specification, figures, or claims, some combination of such operations in other examples may be performed at a same time or in a different order. The sequence of operations described herein may be interrupted, suspended, or otherwise controlled by another process.

Turning now to FIG. 9, an illustration of a flowchart of a process is depicted in accordance with an illustrative example. The process illustrated in this flowchart can be implemented in additive manufacturing environment 100 to form structure 160 in FIG. 1, or can be implemented with additive manufacturing system 200 in FIG. 2 to form three-dimensional part 400 in FIG. 4. In some illustrative examples, the three-dimensional part can be a part or workpiece used in the manufacture or service of an aircraft.

Process 900 exposes a first substrate to a first plasma (operation 910), such that an amine-functionalized substrate is formed, where the amine-functionalized substrate comprises amine chemical moieties. The first substrate can include a polymer material suitably configured for use in an additive manufacturing process. For example, the first substrate can include, nylon, flame-retardant nylon, mineral/glass-filled nylon, polystyrene, polyethylene, polymethylmethacrylate (PMMA), thermoplastic elastomers, polyarylether ketones (PAEK), other polymer material, or the like. In representative implementations, selection of a suitable polymer material can be based on, for example, a desired melting temperature, characteristic of a three-dimensional part so formed, or characteristic relating to stability under conditions for achieving an activation energy associated with forming covalent chemical bonds between substrates.

The first plasma can include ammonia, or the first plasma can conjunctively or alternatively include molecular nitrogen, molecular hydrogen, or molecular nitrogen and molecular hydrogen. Exposure of the first substrate to the first plasma produces an amine-functionalized substrate. The amine-functionalized substrate includes amine chemical moieties on plasma-exposed surfaces of the first substrate. The amine chemical moieties can be —$NH_2$ chemical functional groups. The first substrate can correspond to first substrate 122, and the first plasma can correspond to first plasma 114 in FIG. 1. The amine-functionalized substrate can be amine-functionalized substrate 132 of FIG. 1, first chemically-functionalized substrate 236 in FIG. 2, first side of substrate including first chemical functionalization 310 in FIG. 3, first substrate 410 in FIG. 4, or amine-functionalized sheet 500 in FIG. 5.

Process 900 exposes a second substrate to a second plasma (operation 920), such that an epoxide-functionalized substrate is formed, where the epoxide-functionalized substrate comprises epoxide chemical moieties. The second substrate can include a polymer material suitably configured for use in an additive manufacturing process. The polymer material of the second substrate can be a same polymer material as that of the first substrate. The second substrate can include, nylon, flame-retardant nylon, mineral/glass-filled nylon, polystyrene, polyethylene, polymethylmethacrylate (PMMA), thermoplastic elastomers, polyarylether ketones (PAEK), other polymer material, or the like. In representative implementations, selection of a suitable polymer material can be based on, for example, a desired melting temperature, characteristic of a three-dimensional part so formed, or characteristic relating to stability under conditions for achieving an activation energy associated with forming covalent chemical bonds between substrates.

The second plasma can include oxygen, or the second plasma can conjunctively or alternatively include molecular oxygen or carbon dioxide. Exposure of the second substrate to the second plasma produces an epoxide-functionalized substrate. The epoxide-functionalized substrate includes epoxide chemical moieties on plasma-exposed surfaces of the second substrate. The epoxide chemical moieties can be —O— chemical functional groups, where respective bonds of the —O— group are bonded to geminal atoms bonded to each other—thereby forming a three-membered cyclic ether. The second substrate can correspond to second substrate 124, and the second plasma can correspond to second plasma 118 in FIG. 1. The epoxide-functionalized substrate can be epoxide-functionalized substrate 136 in FIG. 1, second chemically-functionalized substrate 234 in FIG. 2, second side of substrate including second chemical functionalization 320 in FIG. 3, second substrate 420 in FIG. 4, or epoxide-functionalized sheet 600 in FIG. 6.

Process 900 positions the amine-functionalized surface of the first substrate adjacent to the epoxide-functionalized surface of the second substrate (operation 930). The combination of the amine-functionalized substrate and the epoxide-functionalized substrate can correspond to workpiece 140 in FIG. 1, combined substrates 232 in FIG. 2, or some illustrative examples of precursor material 300 in FIG. 3.

Process 900 heats the combined workpiece to form a heated workpiece (operation 940). Heating causes chemical reactions to occur—forming covalent bonds through nitrogen atoms, and also producing water as a byproduct. Exposure to heat causes chemical dehydration reactions to form covalent bonds between amine chemical moieties of the amine-functionalized substrate and epoxide chemical moieties of the epoxide-functionalized substrate. The heated combination corresponds to heated workpiece 150 in FIG. 1. The covalent bonds can correspond to covalent bonds through nitrogen atoms 430 in FIG. 4, or covalent bonds through nitrogen atoms 810, 820, 830, and 840 in FIG. 8. The amine chemical moieties can correspond to amine chemical moiety 510, amine chemical moiety 520, amine chemical moiety 530, and amine chemical moiety 540 of FIG. 5. The epoxide chemical moieties can correspond to epoxide chemical moiety 610, epoxide chemical moiety 620, epoxide chemical moiety 630, and epoxide chemical moiety 640 of FIG. 6.

Process 900 cools the heated workpiece to form a structure (operation 950). In some examples, cooling can include a process of actively removing thermal energy from a layer of the structure, for example, with convective cooling. In other examples, cooling can include a passive process of allowing a heated layer to passively dissipate heat to the local environment. The structure can correspond to structure 160 in FIG. 1, or three-dimensional part 400 in FIG. 4. In some illustrative examples, the three-dimensional part can be a part used in the manufacture or service of an aircraft.

Turning now to FIG. 10, an illustration of a flowchart of a process for an additive manufacturing method is depicted in accordance with an illustrative example. The process illustrated in this flowchart can be implemented in additive manufacturing environment 100 to form structure 160 in FIG. 1, or can be implemented with additive manufacturing system 200 in FIG. 2 to form three-dimensional part 400 in FIG. 4.

Process 1000 adds an amine-functionalized substrate with an epoxide-functionalized substrate to form a first combination (operation 1010). In this operation, the amine-functionalized substrate is provided as a first substrate treated with a first plasma, and the epoxide-functionalized substrate is provided as a second substrate treated with a second plasma. The amine-functionalized substrate can be amine-functionalized substrate 132 of FIG. 1, first chemically-functionalized substrate 236 in FIG. 2, first side of substrate including first chemical functionalization 310 in FIG. 3, first substrate 410 in FIG. 4, or amine-functionalized sheet 500 in FIG. 5. The epoxide-functionalized substrate can be epoxide-functionalized substrate 136 in FIG. 1, second chemically-functionalized substrate 234 in FIG. 2, second side of substrate including second chemical functionalization 320 in FIG. 3, second substrate 420 in FIG. 4, or epoxide-functionalized sheet 600 in FIG. 6. The first combination can correspond to workpiece 140 in FIG. 1, combined substrates 232 in FIG. 2, or precursor material 300 in FIG. 3. The first substrate can correspond to first substrate 122 in FIG. 1, or the first substrate referenced in process 900 in FIG. 9. The first plasma can correspond to first plasma 114 in FIG. 1, or the first plasma referenced in process 900 in FIG. 9. The second substrate can correspond to second substrate 124 in FIG. 1, or the second substrate referenced in process 900 in FIG. 9. The second plasma can correspond to second plasma 118 in FIG. 1, or the second plasma referenced in process 900 in FIG. 9.

Process 1000 thermocycles the first combination to form a thermocycled combination (operation 1020). In this operation, covalent bonds are formed by dehydration reactions occurring between amine chemical moieties of the amine-functionalized substrate and epoxide chemical moieties of the epoxide-functionalized substrate. The thermocycled combination corresponds to heated workpiece 150 in FIG. 1. The covalent bonds can correspond to covalent bonds through nitrogen atoms 430 in FIG. 4, or covalent bonds through nitrogen atoms 810, 820, 830, and 840 in FIG. 8. The amine chemical moieties can correspond to amine chemical moiety 510, amine chemical moiety 520, amine chemical moiety 530, and amine chemical moiety 540 of FIG. 5. The epoxide chemical moieties can correspond to epoxide chemical moiety 610, epoxide chemical moiety 620, epoxide chemical moiety 630, and epoxide chemical moiety 640 of FIG. 6.

Process 1000 forms successive combinations of amine-functionalized substrate and epoxide-functionalized substrate (operation 1030). In this operation, each successive combination is thermocycled to form successive covalent bonds with an immediately preceding combination. Each successive combination can include an assembly of additional layers of alternating amine-functionalized sheet surfaces and epoxide-functionalized sheet surfaces. The successive combinations can comprise any number of workpiece 140 in FIG. 1, heated workpiece 150 in FIG. 1, combined substrates 232 in FIG. 2, precursor material 300 in FIG. 3, or the workpiece referenced in process 900.

In an illustrative example, the amine-functionalized substrate and the epoxide-functionalized substrate are processed and combined to provide a 1:1 stoichiometric ratio of amine chemical functional groups to epoxide chemical functional groups. That is to say, the ratio of amine chemical functional groups to epoxide chemical functional groups can be based on a first number of moles of surface-borne amine groups to a second number of moles of surface-borne epoxide groups. Other ratios of amine-to-epoxide chemical functionalization are also possible. For example, illustrative amine-to-epoxide ratios can be greater than 1:1, or less than 1:1. In representative implementations, a ratio of amine-to-epoxide chemical functionalization can be selected such that a desired amount or density of chemical cross-linking between amine-functionalized substrate surfaces and epoxide-functionalized substrate surfaces is achieved.

Thermocycling can representatively correspond to exposure to heat, a heating cycle, or a heating and cooling cycle. In illustrative examples, thermocycling initiates formation of covalent bonds between the amine-functionalized substrate and the epoxide-functionalized substrate. Successive combinations can include successive covalent bonds between material forming each layer of each successive combination. A heating component of thermocycling can be configured to cause chemical dehydration reactions to occur—forming covalent bonds through nitrogen atoms, and also producing water as a byproduct. A cooling component of thermocycling can be configured to suitably prepare a partially fabricated part for another deposition of another chemically functionalized layer in an additive build sequence. A cooling component of a final thermocycling step can be performed to conclude fabrication of the part.

Successive combinations of amine-functionalized substrate and epoxide-functionalized substrate are sequentially deposited and thermocycled on, over, or above preceding thermocycled combinations. The preceding thermocycled combinations can be regarded as preceding additive build layers in an additive manufacture sequence. Each of the successive combinations is thermocycled to form successive covalent bonds with an immediately preceding combination, or an immediately preceding build layer in the additive manufacture sequence.

Figure 11:
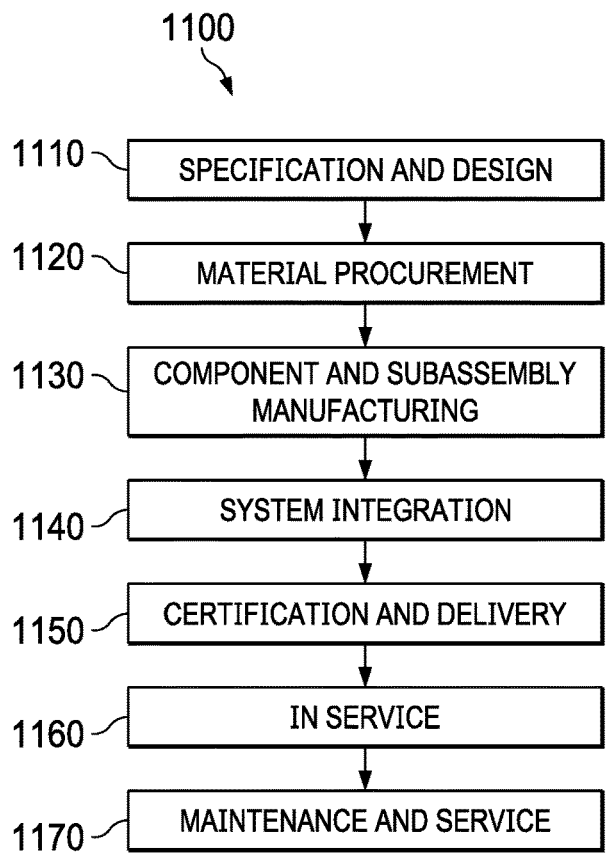
FIG. 11 is an illustration of an aircraft manufacturing and servicing method in accordance with an illustrative example.
Figure 12:
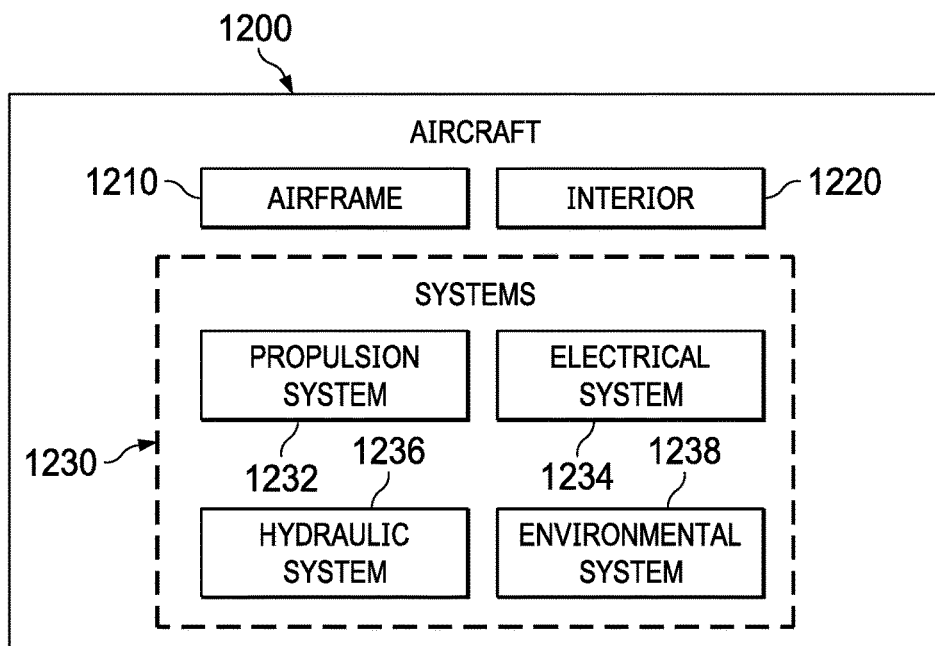
FIG. 12 is an illustration of a block diagram of an aircraft in which an illustrative example can be implemented.

Turning now to FIG. 11, an illustration of an aircraft manufacturing and servicing method is depicted in accordance with an illustrative example. In FIG. 12, an illustration of a block diagram of an aircraft in which an illustrative example can be implemented is depicted. Illustrative examples of the disclosure may be described in the context of aircraft manufacturing and servicing method 1100 as shown in FIG. 11 and aircraft 1200 as shown in FIG. 12. Turning first to FIG. 11, an illustration of an aircraft manufacturing and servicing method is depicted in accordance with an illustrative example. During pre-production, aircraft manufacturing and servicing method 1100 can include specification and design 1110 of aircraft 1200 in FIG. 12 and material procurement 1120.

During production, component and subassembly manufacturing 1130 and system integration 1140 of aircraft 1200 in FIG. 12 takes place. Thereafter, aircraft 1200 in FIG. 12 can go through certification and delivery 1150 in order to be placed in service 1160. While in service 1160 by a customer, aircraft 1200 in FIG. 12 is scheduled for routine maintenance and service 1170, which can include modification, reconfiguration, refurbishment, or other maintenance or service.

Each of the processes of aircraft manufacturing and servicing method 1100 can be performed or carried out by a system integrator, a third party, an operator, or some combination thereof. In these examples, the operator can be a customer. For purposes of this description, a system integrator can include, without limitation, any number of aircraft manufacturers and major-system subcontractors. A third party can include, without limitation, any number of vendors, subcontractors, and suppliers. An operator can be an airline, a leasing company, a military entity, a service organization, or the like.

With reference now to FIG. 12, an illustration of an aircraft 1200 is depicted in which an illustrative example can be implemented. In this example, aircraft 1200 is produced by aircraft manufacturing and servicing method 1100 in FIG. 11, and can include airframe 1210 with plurality of systems 1230 and interior 1220. Examples of systems 1230 include one or more of propulsion system 1232, electrical system 1234, hydraulic system 1236, or environmental system 1238. Any number of other systems can be included. Although an aerospace example is shown, different illustrative examples can be applied to other industries, such as automotive industries, nautical industries, or the like. In the illustrative example, one or more components of aircraft 1200 can be manufactured using workpiece 140 in FIG. 1. For example, workpiece 140 can be used to form various components such as a stringer, a skin panel, or other components in airframe 1210. As another example, workpiece 140 in FIG. 1 can be used to form ducts, ductwork, molding, or other components within interior 1220 of aircraft 1200. These components can have improved strength because of chemical covalent bonds that are present in parts generated using workpiece 140.

Apparatuses and methods representatively described herein can be employed during at least one stage of aircraft manufacturing and servicing method 1100 in FIG. 11. In an illustrative example, components or subassemblies produced in component and subassembly manufacturing 1130 in FIG. 11 can be fabricated or manufactured in a manner similar to components or subassemblies produced while aircraft 1200 is in service 1160 in FIG. 11. As yet another example, one or more apparatus examples, method examples, or a combination thereof can be utilized during production stages, such as component and subassembly manufacturing 1130 or system integration 1140 in FIG. 11. One or more apparatus examples, method examples, or a combination thereof can be utilized while aircraft 1200 is in service 1160, during maintenance and service 1170 in FIG. 11, or both. The use of a number of the different illustrative examples can substantially expedite assembly of aircraft 1200, reduce the cost of aircraft 1200, or both expedite assembly of aircraft 1200 and reduce the cost of aircraft 1200. For example, expedited assembly of aircraft 1200 can be accomplished with rapid prototyping using selective laser sintering additive manufacturing techniques that employ apparatuses and methods representatively described herein—as compared to injection molding that would otherwise provide similar part strength. By way of further example, reduced cost of aircraft 1200 can be accomplished using selective laser sintering additive manufacturing techniques that employ apparatuses and methods representatively described herein—as compared to injection molding that would otherwise involve fabrication of molds.

Examples or illustrations provided herein are not to be regarded in any way as restrictions on, limits to, or express definitions of any term or terms with which they are associated. Instead, the examples or illustrations are to be regarded as being described with respect to a particular example and as merely illustrative. Those skilled in the art will appreciate that any term or terms with which these examples or illustrations are associated will encompass other examples that may or may not be given therewith or elsewhere in the specification, and all such examples are intended to be included within the scope of that term or those terms. Language designating such non-limiting examples and illustrations includes, but is not limited to: "for example," "for instance," "in an example," "in one example," or the like. Reference throughout this specification to "one example," "an example," "an illustrative example," "a particular example," or "a specific example," or contextually similar terminology, means that a particular feature, structure, property, or characteristic described in connection with the example is included in at least one example and may not necessarily be present in all examples. Thus, respective appearances of the phrases "in an example," "in an illustrative example," or "in a specific example," or similar terminology in various places throughout the specification are not necessarily referring to the same example. Use of the term "example," or contextual variants thereof, in no way indicates admission of prior art. Furthermore, particular features, structures, properties, or characteristics of any specific example may be combined in any suitable manner with one or more other examples. In illustrative examples, uniform hatching, or absence of hatching, illustrated in the figures may correspond to a substantially homogenous material. In other illustrative examples, unitary hatching, or absence of hatching, may represent one or more component material layers.

A general aspect of the present disclosure includes an illustrative three-dimensional part. The three-dimensional part includes a first substrate having a first side, and a second substrate having a second side. The second side of the second substrate is covalently bonded through a first plurality of nitrogen atoms to the first side of the first substrate. The first substrate can include a first thermoplastic sheet, and the second substrate can include a second thermoplastic sheet. The first thermoplastic sheet can include a first polymer material, and the second substrate can include a second polymer material. The second polymer material can include a same polymer material as the first polymer material. The three-dimensional part can further include a third side of a third substrate covalently bonded through a second plurality of nitrogen atoms to a fourth side of the first substrate, the fourth side of the first substrate opposing the first side of the first substrate. The third substrate can include a third thermoplastic sheet. The third thermoplastic sheet can include a third polymer material. The third polymer material can be the same polymer material. The same polymer material can include at least one of nylon, polystyrene, polyethylene, polymethylmethacrylate (PMMA), thermoplastic elastomers, or polyarylether ketones (PAEK). Other examples of this representative aspect include corresponding systems, apparatuses, and methods, each configured to utilize an additive manufacturing process to produce the three-dimensional part.

Another general aspect of the present disclosure includes a method of additive manufacturing, that includes exposing a first substrate to a first plasma, such that an amine-functionalized substrate is formed. The amine-functionalized substrate includes amine chemical moieties on a first surface of the first substrate. The method further includes exposing a second substrate to a second plasma, such that an epoxide-functionalized substrate is formed. The epoxide-functionalized substrate includes epoxide chemical moieties on a second surface of the second substrate. The method further includes positioning the first surface of the first substrate adjacent to the second surface of the second substrate to form a workpiece. The method further includes heating the workpiece to form a heated workpiece, and cooling the heated workpiece to form a structure. Heating the workpiece to form the heated workpiece can include heating the workpiece such that covalent bonds are formed between the first surface and the second surface, and causes dehydration reactions to occur between the amine chemical moieties and the epoxide chemical moieties. The first plasma can include at least one of ammonia, molecular nitrogen, or molecular nitrogen and molecular hydrogen. The second plasma can include at least one of molecular oxygen or carbon dioxide. The first substrate can be a first thermoplastic sheet, and the second substrate can be a second thermoplastic sheet. The second thermoplastic sheet can include a same polymer material as the first thermoplastic sheet. The heating can include at least one of a thermal fusion process or a laser sintering process. Implementations of described techniques may include systems, hardware, or apparatuses for performing various method or process steps.

Another general aspect of the present disclosure includes a method for additive manufacturing. The method includes combining an amine-functionalized substrate with an epoxide-functionalized substrate to form a first combination. The amine-functionalized substrate is provided as a first substrate treated with a first plasma, and the epoxide-functionalized substrate is provided as a second substrate treated with a second plasma. The method further includes thermocycling the first combination. Covalent bonds are formed by dehydration reactions between amine chemical moieties of the amine-functionalized substrate and epoxide chemical moieties of the epoxide-functionalized substrate. The method further includes forming successive combinations of amine-functionalized substrate and epoxide-functionalized substrate. Each successive combination is thermocycled to form successive covalent bonds with an immediately preceding combination. The first plasma can be generated from at least one of ammonia, molecular nitrogen, or molecular nitrogen and molecular hydrogen. The second plasma can be generated from at least one of molecular oxygen or carbon dioxide. The first substrate can be a first thermoplastic sheet. The second substrate can be a second thermoplastic sheet. Each successive combination can include at least a pair of opposing thermoplastic sheet surfaces of alternating amine functionalization and epoxide functionalization that are produced from respective plasma treatment. The first substrate can include a first polymer, and the second substrate can include a second polymer. The second polymer can include a same polymer material as the first polymer. The thermocycling can include a selective laser sintering process used in an additive manufacturing process. Implementations of described techniques may include systems, hardware, or apparatuses for performing various method or process steps.

Yet another general aspect of the present disclosure includes a representative additive manufacturing system that includes a laser system. The additive manufacturing system also includes a laminating system that disposes a first chemically-functionalized substrate adjacent to a second chemically-functionalized substrate. The second chemically-functionalized substrate is different than the first chemically-functionalized substrate. Covalent bonds are formed between the first chemically-functionalized substrate and the second chemically-functionalized substrate upon exposure to heat. The additive manufacturing system also includes a build platform, and a controller in communication with the laser system and the laminating system. The controller controls the laminating system to deposit the first chemically-functionalized substrate on the build platform. The controller also controls the laminating system to deposit the second chemically-functionalized substrate on the first chemically-functionalized substrate. The controller also controls the laser system to apply heat to the first chemically-functionalized substrate and the second chemically-functionalized substrate. The first chemically-functionalized substrate can be a first thermoplastic sheet treated with a first plasma. The first plasma can include at least one of ammonia, molecular nitrogen, or molecular nitrogen and molecular hydrogen. The second chemically-functionalized substrate can be a second thermoplastic sheet treated with a second plasma. The second plasma can include at least one of molecular oxygen or carbon dioxide. The first thermoplastic sheet and the second thermoplastic sheet can include a same polymer material; e.g., to promote more uniform interlayer chain diffusion. The same polymer material can include at least one of nylon, polystyrene, polyethylene, polymethylmethacrylate (PMMA), thermoplastic elastomers, or polyarylether ketones (PAEK). Implementations of described techniques may include systems, hardware, or apparatuses for performing various method or process steps.

Still another general aspect includes a representative precursor material for additive manufacturing. The precursor material includes a first substrate. A first side of the first substrate includes a first plurality of amine functional groups. A second side of the first substrate includes a second plurality of epoxide functional groups, with the second side opposing the first side. The first substrate is configured to covalently bond with at least one of a second substrate or a third substrate. Upon exposure to heat, at least one of: the first plurality of amine functional groups forms first covalent bonds with a third plurality of epoxide functional groups disposed on a third side of the second substrate; or the second plurality of epoxide functional groups forms second covalent bonds with a fourth plurality of amine functional groups disposed on a fourth side of the third substrate. The first substrate is configured to covalently bond with at least one of the second substrate or the third substrate upon exposure to heat. Configuration of the first substrate to covalently bond with at least one of the second substrate or the third substrate upon exposure to heat comprises configuration for dehydration reactions to occur between amine chemical moieties and epoxide chemical moieties to form covalent bonds. The first substrate can include a first thermoplastic sheet. The second substrate can include a second thermoplastic sheet. The third substrate can include a third thermoplastic sheet. The first thermoplastic sheet can include a first polymer material. At least one of the second substrate or the third substrate includes a second polymer material. The second polymer material can include a same polymer material as the first polymer material. The same polymer material can include at least one of nylon, polystyrene, polyethylene, polymethylmethacrylate (PMMA), thermoplastic elastomers, or polyarylether ketones (PAEK). Implementations of the described techniques may include systems, apparatuses, or methods, each configured to utilize the precursor material in an additive manufacturing process.

One or more technical solutions are presented that overcome technical problems associated with providing improved inter-layer adhesion in sheet-based additively manufactured parts. Additionally, one or more technical solutions described herein provide technical effects of: enabling formation of chemical bonds between constituent materials used in additive manufacturing processes; enabling fabrication of additively manufactured parts that are at least as strong as parts fabricated with injection molding techniques; enabling increased utilization of additive manufacturing for making strong parts—for example, in rapid prototyping contexts; supporting part qualification with respect to manufacturing specifications or mechanical property requirements; and realizing cost savings associated with using additive manufacturing to make parts that are at least as strong as parts fabricated with other processes.

Descriptions of different illustrative examples has been presented for purposes of illustration and description, and are not intended to be exhaustive or limited to the examples in the form disclosed. The different illustrative examples describe components that perform actions or operations. In an illustrative example, a component can be configured to perform action or operation described. For example, a component can have a configuration or design for a structure that provides the component an ability to perform the action or operation that is described in the illustrative examples as being performed by the component.

Many modifications and variations will be apparent to those of ordinary skill in the art. Furthermore, different illustrative examples may provide different features as compared to other examples. The examples or examples selected are chosen and described in order to explain principles of the examples, practical application, and to enable others of ordinary skill in the art to understand the disclosure for various examples with various modifications as are suited to one or more particular contemplated uses.

What is claimed is:

1. A three-dimensional part, comprising:
   a sintered plurality of sequential component layers comprising plasma-treated polymer powder;
   a first layer comprising a first substrate having a first side comprising an amine chemical moiety located on polymer powder surfaces of the first substrate; and
   a second layer comprising a second substrate having a second side comprising an epoxide chemical moiety located on polymer powder surfaces of the second substrate,
   wherein, the second side of the second substrate is covalently bonded by chemical reaction cross-linking through a first plurality of nitrogen atoms to the first side of the first substrate.

2. The three-dimensional part of claim 1, wherein the first substrate comprises a first thermoplastic sheet, and the second substrate comprises a second thermoplastic sheet.

3. The three-dimensional part of claim 2, wherein the first thermoplastic sheet comprises a first polymer material, and the second substrate comprises a second polymer material.

4. The three-dimensional part of claim 3, wherein the second polymer material comprises a same polymer material as the first polymer material.

5. The three-dimensional part of claim 4, wherein the same polymer material comprises at least one of nylon, polystyrene, polyethylene, polymethylmethacrylate (PMMA), thermoplastic elastomers, or polyarylether ketones (PAEK).

6. The three-dimensional part of claim 5, further comprising:
   a third side of a third substrate covalently bonded through a second plurality of nitrogen atoms to a fourth side of the first substrate, the fourth side of the first substrate opposing the first side of the first substrate.

7. The three-dimensional part of claim 6, wherein:
   the third substrate comprises a third thermoplastic sheet; and
   the third thermoplastic sheet comprises the same polymer material.

8. A three-dimensional part, comprising:
   a plurality of sequential component layers comprising plasma-treated polymer powder;
   a first layer comprising a first substrate having a first side comprising an amine chemical moiety located on polymer powder surfaces of the first substrate; and
   a second layer comprising a second substrate having a second side comprising an epoxide chemical moiety located on polymer powder surfaces of the second substrate,
   wherein, the second side of the second substrate is covalently bonded by chemical reaction cross-linking through a first plurality of nitrogen atoms to the first side of the first substrate.

9. The three-dimensional part of claim 8, wherein the first substrate comprises a first thermoplastic sheet, and the second substrate comprises a second thermoplastic sheet.

10. The three-dimensional part of claim 9, wherein the first thermoplastic sheet comprises a first polymer material, and the second substrate comprises a second polymer material.

11. The three-dimensional part of claim 10, wherein the second polymer material comprises a same polymer material as the first polymer material.

12. The three-dimensional part of claim 11, wherein the same polymer material comprises at least one of nylon, polystyrene, polyethylene, polymethylmethacrylate (PMMA), thermoplastic elastomers, or polyarylether ketones (PAEK).

13. The three-dimensional part of claim 12, further comprising:
   a third side of a third substrate covalently bonded through a second plurality of nitrogen atoms to a fourth side of the first substrate, the fourth side of the first substrate opposing the first side of the first substrate.

14. The three-dimensional part of claim 13, wherein:
   the third substrate comprises a third thermoplastic sheet; and
   the third thermoplastic sheet comprises the same polymer material.

15. A three-dimensional part, comprising:
   a plurality of sequential component layers;
   a first layer comprising a first substrate having a first side comprising an amine chemical moiety located on polymer powder surfaces of the first substrate; and
   a second layer comprising a second substrate having a second side comprising an epoxide chemical moiety located on polymer powder surfaces of the second substrate,
   wherein, the second side of the second substrate is covalently bonded by chemical reaction cross-linking through a first plurality of nitrogen atoms to the first side of the first substrate.

16. The three-dimensional part of claim 15, wherein the first substrate comprises a first thermoplastic sheet, and the second substrate comprises a second thermoplastic sheet.

17. The three-dimensional part of claim 16, wherein the first thermoplastic sheet comprises a first polymer material, and the second substrate comprises a second polymer material.

18. The three-dimensional part of claim 17, wherein the second polymer material comprises a same polymer material as the first polymer material.

19. The three-dimensional part of claim 18, wherein the same polymer material comprises at least one of nylon, polystyrene, polyethylene, polymethylmethacrylate (PMMA), thermoplastic elastomers, or polyarylether ketones (PAEK).

20. The three-dimensional part of claim 19, further comprising:
   a third side of a third substrate covalently bonded through a second plurality of nitrogen atoms to a fourth side of the first substrate, the fourth side of the first substrate opposing the first side of the first substrate.

21. The three-dimensional part of claim 20, wherein:
   the third substrate comprises a third thermoplastic sheet; and
   the third thermoplastic sheet comprises the same polymer material.

* * * * *